United States Patent [19]

Thoma

[11] 3,952,836

[45] Apr. 27, 1976

[54] CONSTRUCTION HOIST CONVEYING SYSTEM

[75] Inventor: Jozsef Thoma, Budapest, Hungary

[73] Assignee: Linden-Alimak AB, Skelleftea, Sweden

[22] Filed: Sept. 27, 1973

[21] Appl. No.: 401,488

[30] Foreign Application Priority Data

Sept. 27, 1972 Hungary .............................. TO 889

[52] U.S. Cl. .................................... 187/2; 104/127; 182/130; 187/7; 198/132; 212/63; 214/1 H

[51] Int. Cl.[2] ................... B65G 37/00; B65G 49/00; B66B 9/18; E04G 21/04

[58] Field of Search ............ 104/127, 131; 182/130; 187/1 R, 2, 7, 9, 16; 198/132; 212/35 R, 63; 214/1 H

[56] References Cited

UNITED STATES PATENTS

| | | | |
|---|---|---|---|
| 100,777 | 3/1870 | Swensen | 187/7 |
| 126,890 | 5/1872 | Lyons | 198/132 |
| 561,223 | 6/1896 | Hamilton | 187/16 |
| 660,724 | 10/1900 | Fischer et al. | 187/1 R |
| 686,330 | 11/1901 | Porter, Jr. | 187/1 R |
| 1,070,910 | 8/1913 | Nichols | 182/130 |
| 3,611,946 | 10/1971 | Heximer | 104/127 |

FOREIGN PATENTS OR APPLICATIONS

| | | | |
|---|---|---|---|
| 135,612 | 2/1960 | U.S.S.R. | 187/2 |

*Primary Examiner*—Robert J. Spar
*Assistant Examiner*—Howard Beltran
*Attorney, Agent, or Firm*—Fred Philpitt

[57] ABSTRACT

A composite transfer device for conveying material used in the construction of high tower-like structures, from a loading position at the base of the structure to a working platform which is raised as building proceeds. The device includes portions giving horizontal and vertical movement of a container, and includes a first transport unit at the loading level, a vertical hoist, and a second transport unit mounted on the working platform. The second transport unit includes a radial track movable around the working platform to deliver materials from the hoist, which is centrally situated, to different working areas around the structure. A special feature of the device is the use of a carrier frame which is square in plan view and which is supported on two hoist ropes attached to opposite corners of the frame, and which is also guided by guide tubes connected to the remaining two corners of the frame and which are located by downwards travelling reaches of the hoisting rope.

5 Claims, 8 Drawing Figures

CONSTRUCTION HOIST CONVEYING SYSTEM

The present invention relates to a composite transport device for conveying persons or material at a building site of a tower-like structure and particularly for supplying building materials to working platforms which are constantly elevated as the construction proceeds, notably working platforms of very high centrosymmetrical structures. The conveying device is provided with a hanger suitable for horizontal and vertical travel of a container.

In most common types of tower-like building structures, industrial chimneys and various towers, for example, water towers, cooling towers, transmitter towers, long range transmitting devices, etc. These buildings may reach a height of several hundred meters or so.

Substantial portions of these structures are made from reinforced concrete and most of them have recently been built by the building method known as sliding or planning shells. The speed of buildling frequently amounts to several meters per day, and this gives rise to many conveying problems in connection with the supplying of building materials to the working platform, the level of which is steadily elevated with the height of structure.

The prior known conveying devices have a common drawback in that where increased height of a structure the conveying is less economical, thus making it necessary to apply for complicated machinery and often even many additional expensive devices.

Particular difficulties are encountered due to the fact that the movement of the conveyed material can only take place in several steps, and that between the particular conveying phases the material size of transfer causes various difficulties.

Many very high structure of centrosymmetrical buildings, i.e. are circular in plan view and have a central vertical axis of symmetry, or have a plurality of axes of symmetry. Moreover the radial dimensions of particular working platforms vary within broad limits. This means that the building materials which need to be delivered to the working platform from its place of arrival must be further conveyed to the different distant points of the structure.

In the above mentioned type of structures, the conveying is carried out in basically three steps. The first step is the movement of the material on the ground surface or on the loading platform of the construction site. The second step is the vertical lifting of the material, and the third step includes further conveying of material to the place of its installation.

In order to meet the handling requirements, various solutions have already been proposed, which, however, are basically concerned with the question of vertical conveying. To these belong various mast cranes and hoists for instance those used by the Swedish firm of Alimak. However, the mast cranes are not economical for construction of structures over 656 or 984 feet (200 or 300 meters) in height, primarily due to the difficulties connected with assembling the mast. Therefore, it is preferable to use rope hoists when building structures of great height.

The rope hoist has at least rope reel which is located at ground level. A rope is guided by guide pulleys and deflection rollers located above the ground level and at the working level. A means for receiving the material is usually a hanger which is preferably adapted for moving a container. The container is usually provided with a guiding tubular sleeve, which is arranged to receive at least one run of the rope thereby preventing the swinging or turning of the container. Such device is referred to as a hoist rope guide.

The essence of prior rope guiding methods is that upon gripping the conveying cage or container at a point which is coincident with the vertical axis through to the center of gravity thereof, the hoisting rope travels in a vertical direction up to the working platform, then in a horizontal direction over two guide pulleys and thereupon again vertically down to guide pulleys located at ground level in such a way that the rope is passed through the guiding collar fixed to the side of the container or conveying cage. This method, also referred to as "positive rope guide" is unsuitable for transportation of persons, as it does not provide for the required safety upon rope breakage. It is also unsuitable from the point of view material material handling as in the mataerial transfer on the loading platform, and in the transfer on the working platform, the container has to be moved or swung sideways from the location substantially coincident with the vertical line of hoisting.

Another known method of rope guiding resembles to a great degree the above method, the difference being in that the container or conveying basket is provided at appropriate places with symmetrically disposed guide collars and with at least two hoisting ropes for conveying the load vertically upwardly, whereby turning of the load is prevented. The advantage of this particular solution is in that it is suitable for transport of persons, as in case of rope tear the other rope provides sufficient safety for lowering of the conveyed cage or for at least holding the conveying cage stationary.

Another development of these methods is the system wherein the guide ropes are made independent of hoisting ropes. Even if only one rope is used in this case, it is still possible to catch the conveying cage in the case of rope failure and hold it steady until disembarking of the rescued persons in any position due to the strap and brake device mounted on the carrier assembly of the apparatus. However, the lowering of the cage with the persons inside from a height of say 492 to 656 feet (150 to 200 meters) poses problems.

Although two of the above described solutions are suitable for transport of persons, they are still not suitable for the above noted three-step procedure of material loading and transfer. Moreover, they do not make it possible to organize an unrestricted flow of material in vertical direction towards the working platform.

It is an object of the present invention to provide a composite conveying device which firstly provides for the supply of material in the construction of very high structures in a method and manner which is more efficient and economical than the prior known methods. It is a further object of the invention to provide a device which is suitable and safe for the transport of persons. It is still a further object of the present invention to provide a device which makes it possible to carry out the conveying in three steps, the transfer points of which allow the delivery and transfer of the material without sideways movement of the container, and at the same time provide for continuous material handling.

The basic idea of the present invention lies in recognizing that so-called "positive rope guiding" can also be utilized in a way wherein two mutually independent hoisting ropes are arranged to define mutually parallel planes thus providing between the two planes for an open "conveying square", the center of which is not only coincident with a vertical line passing through the container at all times but which also provides for the possibility of material delivery to the working platform without sideways movement of the container.

Further inventive teachings are in recognizing that it is possible to compensate for the angular deviation of the carrier frame or connector assembly due to disproportional elongations of the hoisting rope or due to any other external factors, by means of a suitably guided compensation rope or cable, wherein the hoisting rope is not fixed directly to the carrier frame but rather through a guided compensation rope passing through the frame.

According to the invention, a composite conveying system is provided for conveying of material and persons during the building of a tower-like, particularly centrosymmetrical structure, for supplying material to an upper working platform level of elevation of which is constantly changed, said system including conveying elements suitable for horizontal and vertical moving of a conveying vessel or container, said system having a transport unit on the loading platform on the ground level, a vertical hoist for lifting, and a transport unit on the working platform, the transport unit of the loading platform suitably consisting of transport means movable on a closed path, said path having a point of coincidence with the vertical axis of the vertical hoist, said point of coincidence also being the lower transfer point in which the path of the hoist and the path of the transport unit intersect one another at the loading level, the vertical axis of symmetry of the centrosymmetrical structure coinciding with the vertical axis of the vertical hoist, while the transport unit of the working platform located at a variable level is supported by a circular track of variable radius and provides for radial transport, the center of said track having a point of coincidence with the veritcal axis of symmetry of the working platfrom, this point of coincidence being also the transfer point of the hoisting path to the track of the transport unit of the working platform.

A further feature of the conveying device according to the present invention is that the transport means in the loading area or on the loading level is a vehicle adapted for transportation of a plurality of containers and that, further, along the path of travel of this vehicle is provided at least one loading station for filling the containers and/or removing empty containers and loading the filled conntainers on the vehicle.

The hoist for vertical lifting includes a carrier frame supported by two mutually independent hoisting ropes, said carrier frame being suspended on hoisting ropes guided to run about bearing pulleys which are disposed at the working platform of variable height.

The hoisting ropes of the carrier frame are arranged to pass over four separate bearing pulleys, however, the axis of the hoisting path passes through the center of gravity of the rectangle defined by the four suspension or bearing pulleys.

In plan view, the carrier frame is of a parallelogram or rectangular shape. It is a sturdy triangulated structure having a shape such as could be produced by bending a rhombus along its shorter diagonal to form a "V" configuration whereby the hoisting connection points are located at a higher level than the guiding connection points, which are disposed at the ends of the shorter diagonal of the rhombus.

Disposed at the guiding connection points of the carrier frame are preferably guiding tubular collars which are pivotally secured to the frame, and through each of these guiding sleeves passes one of the hoisting ropes.

The carrier frame is a pipe frame structure which basically consists of two V-shaped members the lower ends of which are spread apart and the upper arms of which are connected together. These lower end points of the frame which are arranged apart from one another are the guide connection points, while the upper connection points are the hoisting connection points. A compensation rope is passed for free movement through the inside of the tubes forming the frame, the compensation rope being suspended from the hoisting rope, whereby the hoisting connection points of the frame are maintained in leveled position even with the stretching of a hoist rope.

At the guiding connection points of the carrier frame are arranged guide pulleys between the two tubes forming the sides of the frame, which are arranged at an oblique angle to one another. The pulleys guide the compensation rope during its movement upon an angular deviation of the frame. Arranged at the hoisting connection points are guiding pulleys and deflecting rollers which facilitate the movement of the compensation rope. Arranged above the hoisting connection points are suitable eyes for connection with the end of the hoisting rope. At the ground level, the end of the hoisting rope is secured to the structure, preferably on the drum of a hoist mounted on the the loading level. From there, the rope passes over guiding pulleys on the loading platform to change its direction, further to the rope guiding sleeve of the carrier frame, up to the bearing pulley mounted on the working platform, and therefrom over an associated bearing pulley of the working platform and vertically downwardly towards the hoisting end point of the carrier frame.

The advantages of the composite conveying device according to the present invention are apparent in various ways. The most significant of its advantages is that the passage and transfer of the container at the transfer between the particular conveying portions can be effected without lateral movement of the container. This is achieved by maintaining the "hoisting rectangle" unrestricted at all times, by means of rope guiding.

The second technologically significant advantage is that as a result of the provision of the compensation rope, an angular deviation of the carrier frame can never occur. It is of further advantage that despite the steadily elevated level of the structure, the movement of the conveying container in both directions can be effected quickly and safely, and that the container is not exposed to swinging motion or turning. The same advantages make it possible to use the device for transportation of persons.

It is also an advantage that the horizontal movement of the container requires only a minimum time. Moreover, the delivery and take over of the container between the particular conveying sections is very simple and can directly follow one another. The concentric arrangement of the vertical conveying results in that the delivery and transfer of the container on the working platform can be effected in any required angular arrangement of the transporting unit working platfrom. Thus, the transporting unit can at any time be readily adjusted according to the instantaneous radial dimensions of the structure.

The invention will now be described in greater detail with reference to the accompanying drawings.

IN THE DRAWINGS

FIGS. 4—7 show various steps carried out in exchanging of an empty container for a filler container, as performed in the device according to the invention.

Figure 8:
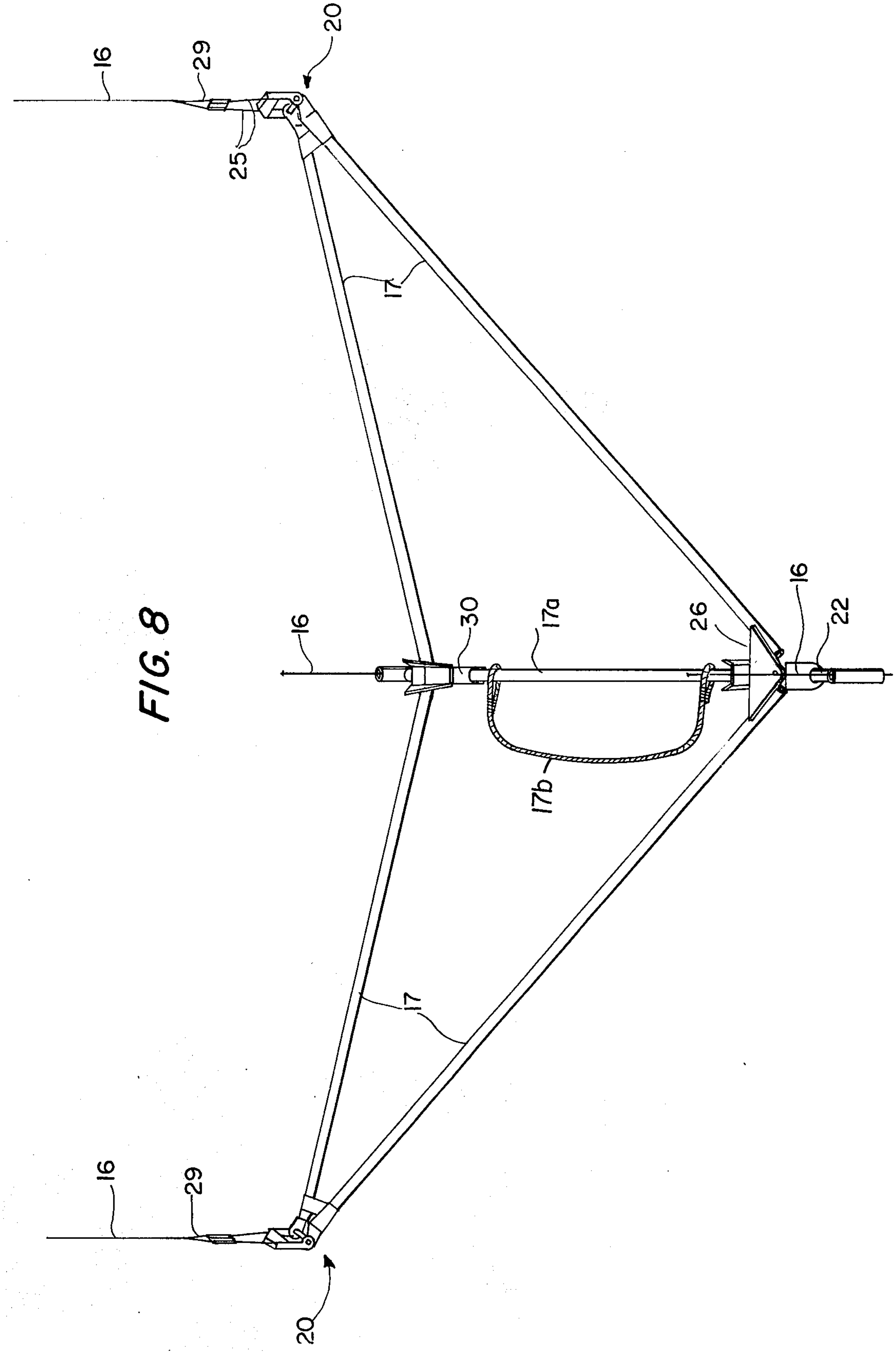

FIG. 8 is a perspective view showing the carrier framework with the hanger of the container assembly having a ball attached thereto and with the container removed.

Figure 1:
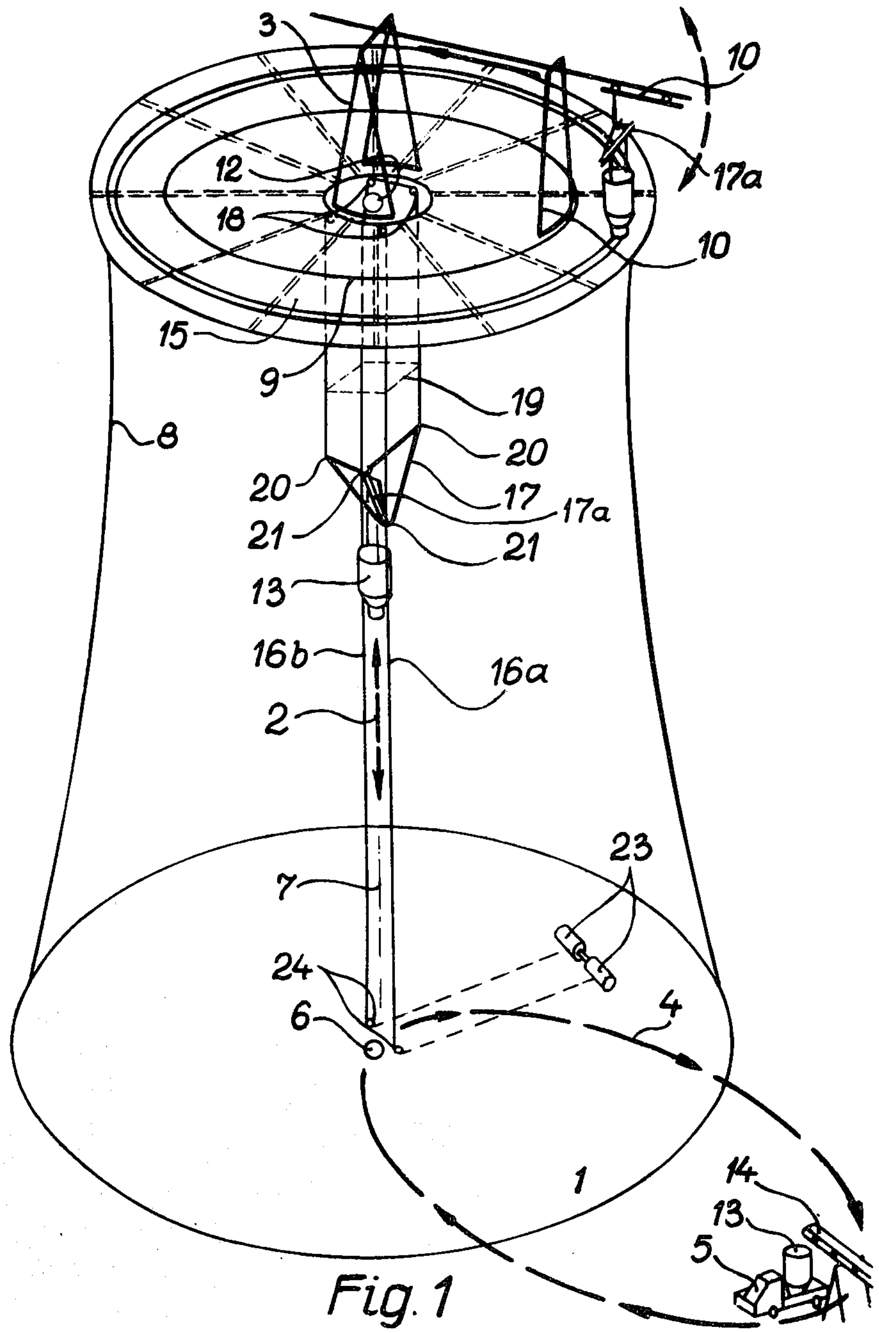
FIG. 1 is the principal arrangement of the composite conveying device according to the present invention.

FIG. 1 diagrammatically illustrates an embodiment of the composite conveying device of this invention as having three basic portions, notably the transporting unit 1 at the loading level, the vertically arranged hoist 2, and the transporting portion 3 at the work level. The essential portion of the transporting unit on the loading level is the path 4 which designates the travel of the transporting means 5. This path 4 does not necessarily have the circular shape shown in the drawing. It can be of various shapes of closed loop, for example it can consist of a polygon comprising straight lines, or it can even be U-shaped, etc. The transporting device 5 is used for delivery of the container, which can be referred to as a material conveying device or conveying cage for transportation of persons, to a predetermined lower transfer point 6, in which the loading transport unit 1 and the hoist 2 meet each other. This transport point 6 is coincident with the axis 7 of the hoist 2.

If the structure 8 in question has at least two axes of symmetry, the longitudinal axis 7 of the hoisting path 2 is coincident with the sectional plane of symmetry. Positioned on the constantly elevated working platform of the structure 8 is a circular path 9, which makes it possible to achieve circular movement of transport means 10. This transport means 10 is preferably arranged as a traveling [gantry] crane, the carrier of which is used at the same time as the track 11 for radially oriented movement of the load.

The load, which has been delivered by the hoist 2 to the working platform, is transferred at the upper transfer point 12 to the transport means 10, which then conveys the elevated material along the radial track 11 to the place of application or installation. In order to make it possible to deliver the container to any desired point, the track 11 of the transport means 10 is arranged to be movable on a circular path 9 over a full circle. Thus, the described device makes it possible to transfer the container 13 from a location forming the part of the transporting unit 1, designated as loading area 14, to any appropriate point on the working platform 15.

The container 13 is suspended from a carrier frame 17 by means of a hanger **17*a*. The carrier frame 17 is moved by hoisting ropes 16*a* and 16*b*. The hoisting ropes 16*a* and 16*b* are arranged to pass over bearing pulleys mounted on the working platform 15, the bearing pulleys 18 being arranged in a path for each of the particular hoisting ropes 16*a*, 16*b*. By virtue of this arrangement, the hoisting ropes 16*a* and 16*b* extend along vertical paths determined by the bearing pulleys 18, thus leaving, in plan view, the conveying rectangle 19 free. Consequently, the container 13 moves inside the rectangle 19** at all times.

Figure 2:
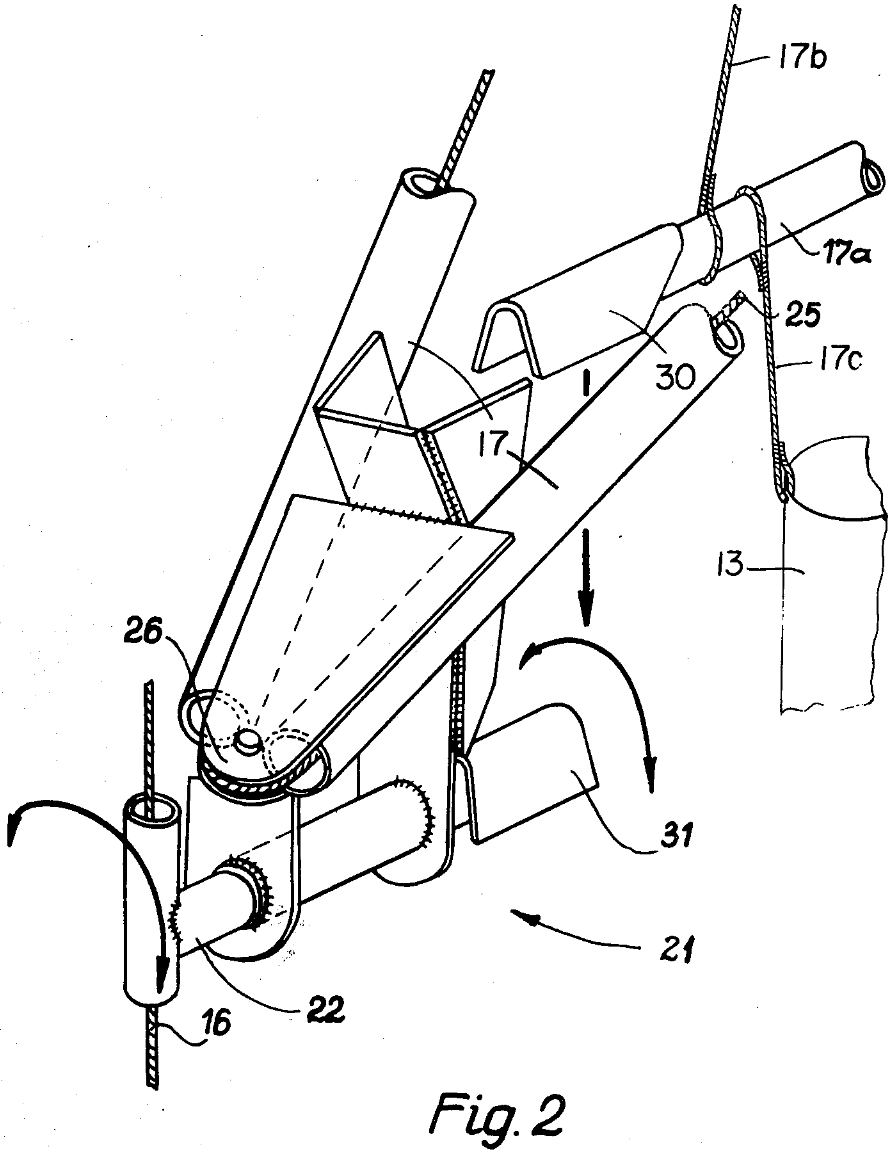
FIG. 2 is a guiding connection point of the carrier frame shown in FIG. 1, in an enlarged perspective view.
Figure 3:
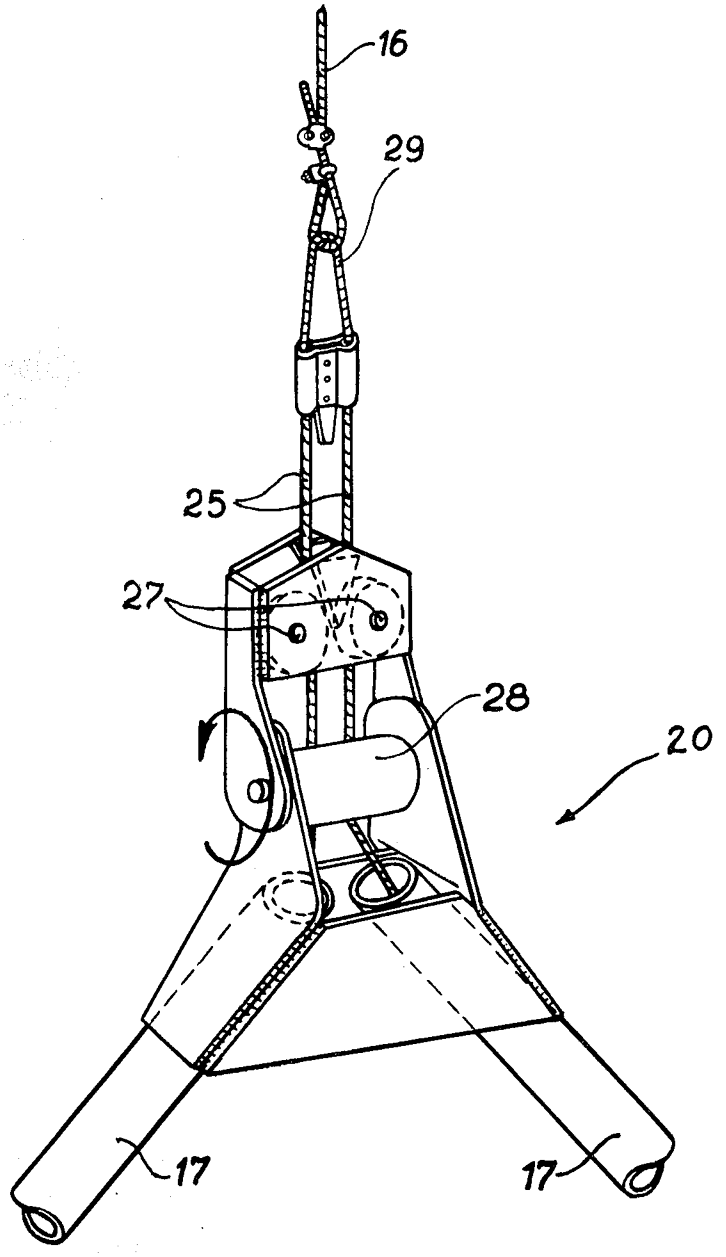
FIG. 3 is a hoisting connection point of the carrier frame shown as, similarly to FIG. 2, an enlarged perspective view.

As shown in FIG. 2 and FIG. 3, the carrier 17 is built from tubular members which are arranged in a V-shaped configuration, as described above. The upper connector points of the V-shaped structures are the hoisting connection points 20 of the carrier frame 17 shown in FIG. 3, while the lower terminal points of the downwardly spreading V-shaped structural members provide the guide connection points 21 shown in FIG. 2. In the guide connection points are pivotally arranged a rope guide 22, which is used in guiding the hoisting rope 16.

The hoisting ropes **16*a* and 16*b* extending from the winding engine of the hoist at the loading level, extend vertically between the guide pulleys 24 which are disposed at the loading level, and the bearing pulleys 18 of the working platform 15, the vertical portions of these ropes also passing through the rope guiding tubular collars 22 of the frame 17. After having passed over the bearing pulleys 18, the hoisting rope 16 is again guided downwards to follow a vertical path until it reaches the connection point 20 of the carrier frame 17**. At this point, the load is received by the hoisting rope and is elevated.

The carrier frame 17 is steadily maintained in a level position, as it is suspended by a compensation rope 25, on which the carrier frame can freely move in the required direction and to a required extent. The compensation rope 25 extends to the guiding connection points 21 over the guiding pulleys 26 and by guiding pulleys 27 and deflecting rollers 28 at the hoist connection point. The self-alignment of the carrier frame on the compensation rope 25 is possible due to the fact that the hoisting rope 16 is never connected directly to the carrier frame but rather through the compensation rope. The connection is made possible by providing at the end of the hoisting rope 16 a loop 29. In other words, a self-adjustment of the position of the frame means that the hoist connection points are always at the same level, and even if one of the hoisting ropes stretches, the rope 25 can move within the tubular members of the frame so that the proper vertical disposition of the frame is maintained by virtue of the guide collars 22.

A further element to be mentioned is the hanger **17*a* carried by the carrier frame, and which can be used, without further means, as a suspension for the container. It will be apparent from FIG. 2 that each end of the hanger 17*a* is provided with an endpiece 30, the endpieces simply resting on supporting brackets 31 extending between the lower guiding connection points 21, so that the hanger is removable from the frame 17** along with a container carried thereby.

Figure 4:
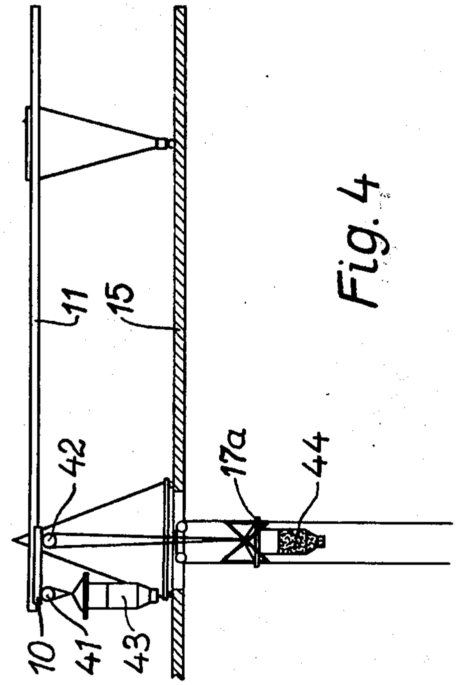
Figure 5:
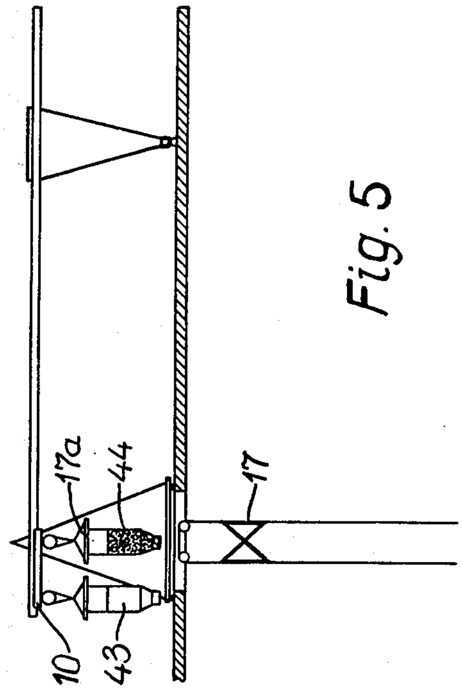
Figure 6:
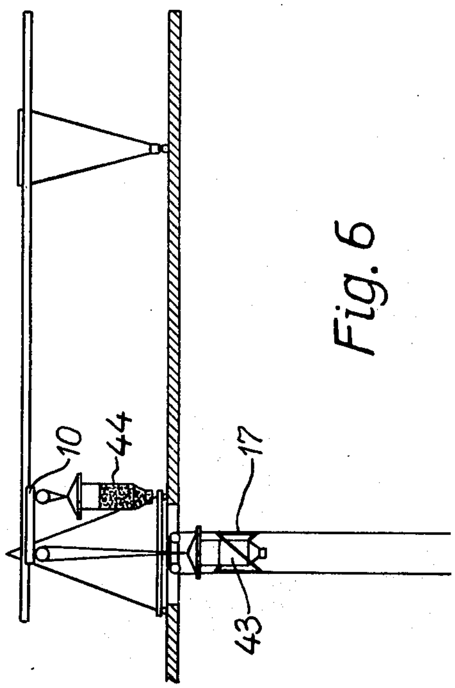
Figure 7:
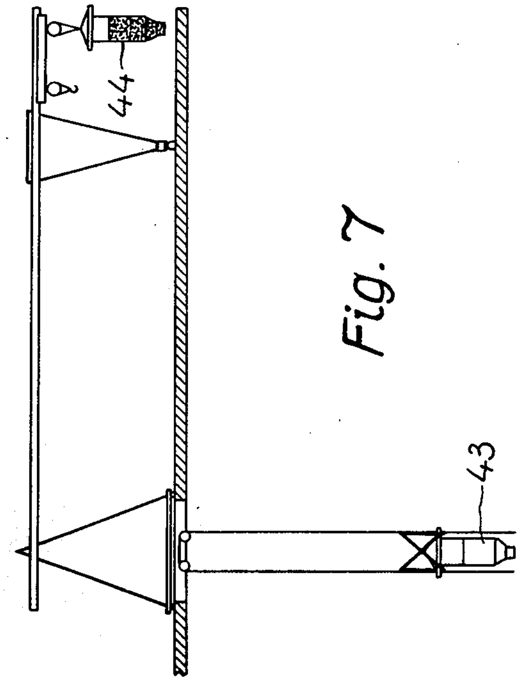

As best seen in FIGS. 4–7, the transport means 10 consists of a traveling winch with two hoisting units 41 and 42, in order to increase the conveying capacity of the device. Thus, the vertical hoisting portion and the working platform transport means can simultaneously operate with one container each. In FIG. 4, the container 43 is empty. A filled container 44 is being elevated by the carrier frame 17, until it reaches the point from which it can be further elevated by hoisting unit 42, which can be connected to the hanger **17*a*. The container is then elevated until it reaches the position of FIG. 5. The travelling winch 10 is then moved to assume the position shown in FIG. 6 and the empty container 43 is sunk into the carrier frame 17. The container 43 is then moved away for further loading and at the same time the container 44 can be transported on the radial track 11** for unloading.

I claim:

1. In the known type of hoisting arrangement that is useful in connection with the construction of a high tower-like structure and which includes a vertically movable carrier frame for transporting a load from a loading position adjacent the base of the tower-like structure to an elevated working platform which rises as to the tower-like structure rises, the improvement in said carrier frame which comprises:

a. two mutually independent hoisting ropes arranged to suspend said carrier frame, b. said carrier frame having a shape corresponding to that achieved by bending a rhombus along its shorter diagonal to form a V-shaped configuration, c. two hoist connection points for the hoist ropes located on said carrier frame at points on said carrier frame corresponding to the ends of the longer diagonal of said rhombus, d. two guiding connecting points for the hoist ropes located on said carrier frame at points on said carrier frame corresponding to the ends of the shorter diagonal of said rhombus, e. said two hoist connection points being located at a higher level on said frame than said two guiding connection points.

2. A hoisting arrangement according to claim 1 characterized in that guiding connection points of the carrier frame are provided with pivotally connected rope guiding tubular collars through which one of the return reaches of the hoisting ropes are adapted to pass.

3. A hoisting arrangement according to claim 1 characterized in that the carrier frame is a tublar structure, the tubes of the structure being arranged so as to form two V-shaped members disposed at an oblique angle with respect to each other, each of which spreads apart in the downward direction, wherein the lower ends of the spread apart V-shaped members come together to form two spaced apart guiding connection points for rope guides, and the upper ends of each V-shaped member serving as a connecting for a hoist rope, while disposed inside the tubes forming the carrier frame is a compensation rope which is suspended from the hoisting ropes and is freely movable inside the tubes, thus constantly maintaining level the hoisting connection points for the hoist ropes.

4. A hoisting arrangement according to claim 1 characterized in that adjacent the guiding connection points of the carrier frame, and between said tubular members which disposed at an oblique angle to one another, are provided deflecting pulleys disposed in accordance with the change of the direction of the compensation rope, and in that arranged preferably at the hoisting connection points connected to the hoist ropes are guiding pulleys and deflection rollers for facilitating movement of the compensation rope, and that above the hoisting connection points are provided eyes for connecting the compensating rope to the respective hoisting ropes.

5. A hoisting arrangement according to claim 1 characterized in that a container is adapted to hang in the carrier frame by a hanger which is insertable into the carrier frame from the top.

* * * * *